May 2, 1967 W. H. K. P. T. ASCHERMANN 3,317,842

CIRCUIT FOR TUNING INDICATION

Filed July 2, 1963 2 Sheets-Sheet 1

INVENTOR.
W. H. K. P.T. ASCHERMANN
BY
AGENT

May 2, 1967 W. H. K. P. T. ASCHERMANN 3,317,842

CIRCUIT FOR TUNING INDICATION

Filed July 2, 1963 2 Sheets-Sheet 2

INVENTOR.
W. H. K. P. T. ASCHERMANN
BY
Frank R. Jifari
AGENT

United States Patent Office 3,317,842
Patented May 2, 1967

3,317,842

CIRCUIT FOR TUNING INDICATION

Wilfried Hans Karl Peter Theodor Aschermann, Hamburg-Harburg, Germany, assignor to North American Philips Company, Inc., New York, N.Y., a corporation of Delaware Filed July 2, 1963, Ser. No. 292,235
Claims priority, application Germany, June 28, 1962, P 29,707
16 Claims. (Cl. 325—455)

This invention relates to a tuning system for communications receivers and more particularly to a tuning system including means for visually indicating to an operator when the receiver is tuned properly.

The invention solves certain problems that arise in tuning indicator circuits in which a direct indication voltage, which has a maximum value when the tuning is correct, is applied to an indicating device. The maximum value generally arises due to the incoming signals, preferably the intermediate-frequency oscillations, being applied to a resonant circuit across which a maximum value of the voltage appears with correct tuning. It will be evident that a corresponding action also occurs when the value of the current is used for the indication. A similar characteristic dependent upon tuning is also obtained without a special resonant circuit by means of the response curve of the receiver, more particularly, the intermediate-frequency response curve. However, in this case the maximum value is not clearly defined. The tuned position is adjusted by an operator in the usual manner by adjusting approximately to the desired transmitter, preferably by ear or by scale. To find the exact point of tuning, the tuning control is turned backwards and forwards at a given rate, for example, one to two times per second. Thus, the carrier frequency of the transmitter periodically traverses the resonance curve of the tuning circuit or the response curve of the amplifier so as to produce an indication voltage which is in practice approximately sinusoidal, as shown by curve *a* in FIGURE 1. This curve shows the negative indication voltage U plotted against a (first) vertical time axis (*t*). The indication voltage is displayed by means of an indicating device, resulting in an indication magnitude A which may exhibit a variation above a second horizontal time axis (*t*), as illustrated by curve *c* in FIGURE 1. The correct tuning point can be determined in a simple manner, especially when adjusting to the central point between the clearly visible sides of the halves of the sinusoidal line. It is then also possible to vary the amplitude of the periodic variations in frequency and also to decrease or increase the frequency of the periodic variations in tuning in order to obtain a more accurate indication.

However, the indicating device, more particularly a cathode-ray indicator tube having a variable shadow angle, usually exhibits a logarithmic response characteristic (K in FIGURE 1) of the indication magnitude A as a function of the control voltage U, for example negative, so that for a high indication voltage (curve *b*) the variations thereof are less clearly visible because the corresponding variation of the indication according to curve *d* is greatly smoothed near the top of the peak. So a "saturation phenomenon" of the indication occurs, resulting in the tops being smoothed and broadened still further for high indication voltages. As a result, an exact tuning adjustment is very difficult. This occurs especially in the case of a strong input signal, for example, upon reception of a local transmitter where a very accurate adjustment is desirable per se, because as a result of the strong signal ordinary interference becomes substantially inaudible so that any distortion due to errors in tuning becomes apparent very clearly.

Overcontrol may be avoided by applying the indication control voltage to the indicating device through a voltage divider proportioned so that a favourable indication occurs for the maximum expected value of the indication voltage. However, in this case the lower indication voltages from weak transmitters are also greatly attenuated and fall within a region wherein variations in the tuning indication voltage are hardly still noticeable. But also in the case of weak transmitters, an accurate tuning and hence an accurate indication are important, especially to minimize distortion and interference from local transmitters which may be stronger. This disadvantage may be mitigated by bridging the longitudinal resistance arm of the voltage divider, which is included in the control voltage lead of the indicating device, by a capacitor having a capacitance such that its discharge time-constant is long relative to the time during which on tuning the extreme value of the indication voltage is passed. Then, in the stationary condition, the direct indication voltage is decreased and overcontrol avoided. However, the periodic variations in tuning described hereinbefore are transmitted substantially without attenuation and thus cause strong variations in indication so that a correct adjustment can also be made in the case of weak input signals. True, on the other hand, the disadvantage when arises that at a high indication voltage, the peak-shaped voltage variations are likewise transmitted with substantially full amplitude and that the peaks give rise to overcontrol and are smoothed. In this case, an adjustment is in practice still possible only with the aid of the sides, but these are comparatively wide apart so that the accuracy is noticeably decreased.

These disadvantages are avoided by means of my novel tuning indication circuit. In accordance with the invention, a direct indication voltage, which has an extreme value with correct tuning, is applied to an indicating device through a voltage divider comprising at least two resistors. At least one of the resistors included in the series-branch has a capacitor connected in parallel with it having a discharge time-constant which is long relative to the time during which on tuning the extreme value of the indication voltage is passed. In other words, the discharge time-constant of the capacitor must be sufficiently long relative to the tuning period to insure that the capacitor remains fully charged during subsequent tuning manipulations whereby the further sinusoidal variations in the tuning voltage are passed to the indicator device with little or no attenuation. In this circuit, a clear indication in a favourable region of the characteristic of the indicating device may be obtained highly independently of the magnitude of the extreme value of the tuning indication voltage if, according to the invention, a point at the input of the indicating device is connected through a diode D to a point of at least approximately constant potential and if a certain portion of the resistors included in the charging circuit of the capacitor is bridged by said diode. In this case, the maximum value of the indication voltage at the input of the indicating device is shifted approximately towards the value of the fixed potential due to the fact that the capacitor is charged to at least approximately its final value during the first passage of the indication voltage through a resonant peak in the response curve.

The resistors are preferably proportioned so that the charging time-constant of the capacitor is considerably shorter than the discharging time-constant when the diode is conducting during the charge. In fact, a charging time-constant of about 3% to 25%, preferably about 15% to 20% of the discharging time-constant has been found to be especially favorable. It is advantageous to design the circuit so that the charge time of the capacitor is less than 100 milliseconds, preferably less than 20 milliseconds.

An improvement may be obtained by including a voltage divider comprising the series-combination of a voltage-dependent resistor and an ohmic resistor in series with the indicating device. As a result, high voltages located near the maximum value are transmitted much better than are low voltages.

In order that the invention may be readily carried into effect, it will now be described in detail, by way of example, with reference to the accompanying diagrammatic drawings, in which.

Figure 2:
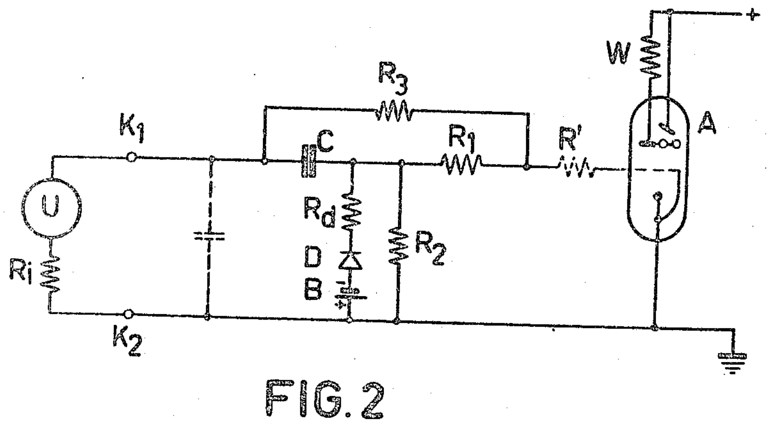
FIG. 2 illustrates a first embodiment of the invention.

In FIGURE 2, a source U of tuning indication voltage is shown which has an internal resistance $R_i$ and which may be obtained, for example, by means of a rectifying circuit connected to receive the intermediate-frequency voltage developed across a resonant circuit in a superheterodyne receiver tuned to the nominal frequency. Voltage source U is connected to terminals $K_1$ and $K_2$, of which the terminal $K_2$ is connected to ground. Also connected to the terminals $K_1$ and $K_2$ is the series-combination of a capacitor C, a diode D and a bias potential battery B. When the indication voltage on approaching the nominal frequency assumes a more negative value, the cathode of diode D must be connected to the capacitor C. The diode then becomes conducting when the indication voltage decreases. The common point of capacitor C and diode D is connected, on the one hand, through a resistor $R_1$ of, for exmaple, 5kΩ to the input of the indicating device A, in this example the control grid of a tuning indicator tube A known per se and, on the other hand, connected through a parallel resistor $R_2$ of, for example, 1.5MΩ to the terminal $K_2$. Furthermore, a resistor $R_3$ of, for example, 50kΩ is connected between the terminal $K_1$ and the control grid of the tuning indicator tube A. The cathode of tube A is connected to ground. The anode of the amplifying system of this tube is connected to control electrodes of the cathode-ray indicator system and connected through a resistor W to the positive terminal of the source of supply. The screen of the indicator system is also connected to the source of supply.

Figure 1:
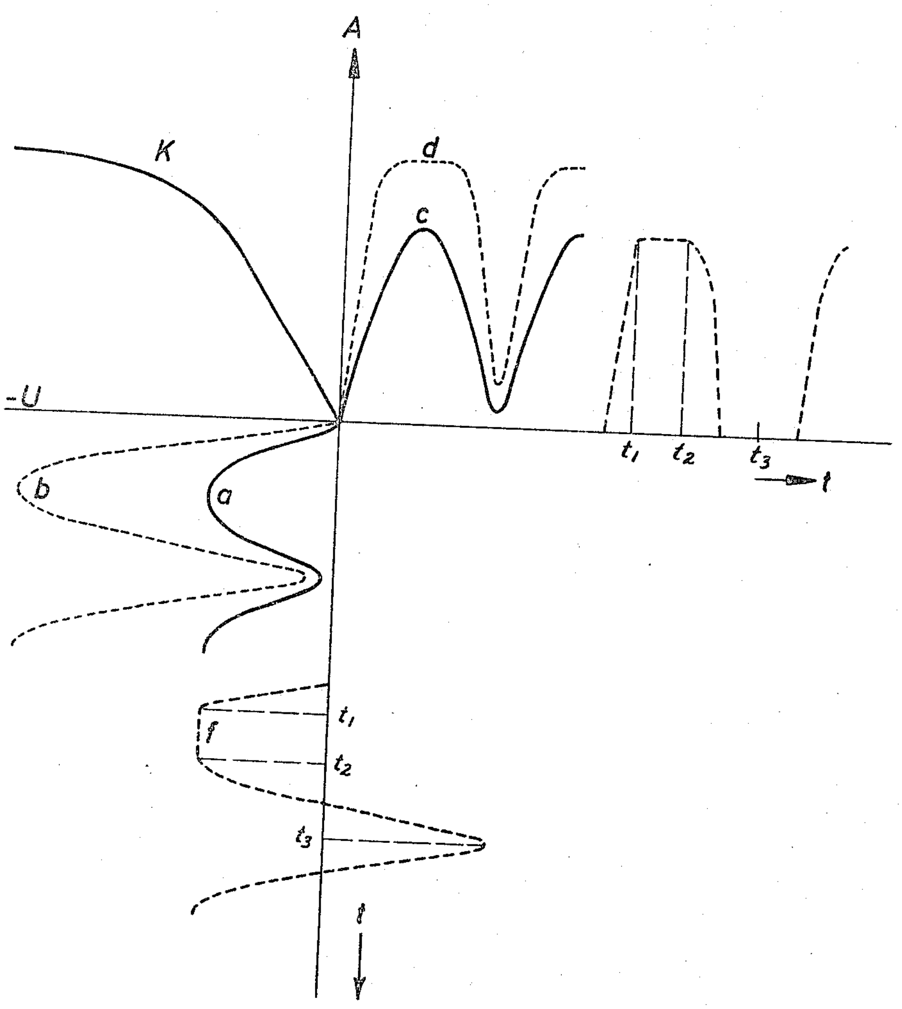
FIG. 1 is a graph of the response curves useful in explaining the invention.

When the receiver is tuned, the indication voltage increases from a small value at which time it is transmitted substantially undiminished to the grid of tube A through the voltage divider comprising the resistors $R_1$, $R_2$ and $R_3$ and through the capacitor C. When the indication voltage at the terminals $K_1$ and $K_2$ increases further to the value of the bias potential source B, the diode D begins to conduct. The capacitor C is then rapidly charged because for all practical purposes, only the internal resistance $R_i$ is active as the charging resistance. The voltage at the input of the indication device A, as shown by curve *f* in FIGURE 1, remains approximately constant and equal to the voltage of the battery B during this interval $t_1$–$t_2$. When the maximum value of the indication voltage U is reached, the capacitor C is fully charged and the diode D becomes non-conducting. When the indication voltage now again decreases to its initial value, for example, 0 volt (moment $t_3$), a voltage is set up at the grid of tube A which is increased by an amount approximately equal to the voltage of capacitor C. Under certain conditions, an overcontrol of the indicator tube A takes place, but in a direction which is not used for indication purposes. If there is a risk of the capacitor C being prematurely discharged due to the occurrence of grid current, an additional limiting resistor R′ of, for example, 500kΩ may be included in series with the grid of the indicator tube A.

When the voltage at the terminals $K_1$, $K_2$ increases (becomes more negative) during the subsequent tuning movement, it remains higher by an amount equal to the voltage on the capacitor C and its peak reaches the value determined by the battery B. The diode D thus remains cut off so that the voltage variation is indicated substantially in full and without distortion.

The circuit shown in FIGURE 2 affords the further advantage that low direct voltages which do not reach the value of the battery B arrive at the indicating device A substantially undiminished even in the stationary condition (without tuning variation). However, in the case of a higher direct indication voltage, the diode D becomes conducting and bridges the resistor $R_2$ so that a division in the ratio of the resistors $R_1$ and $R_3$ takes place for the portion of the voltage at the terminals $K_1$, $K_2$ which exceeds the value of battery B. The sensitivity of indication thus reaches its maximum value upon reception of weak transmitters and is decreased to the desired extent only upon reception of strong transmitters.

Whenever the peak values of the voltage U appear during a tuning operation, the diode becomes conducting for a short time in order to supplement the amount of electricity on the capacitor C which has been lost due to discharge, whereby the voltage at the common point of the diode D and the resistor $R_1$ is smoothed. This action may be decreased or suppressed by a corresponding increase of the resistor $R_1$ or more particularly by including a resistor $R_d$ of, for example 300kΩ in the portion of the charging circuit which includes the diode D.

Figure 3:
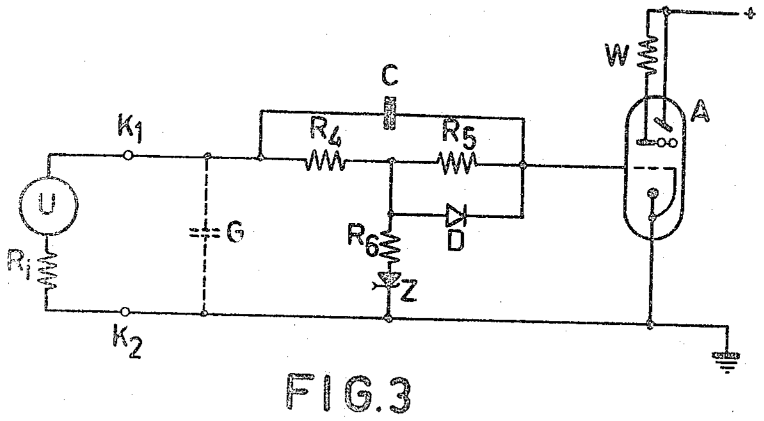
FIG. 3 illustrates a second embodiment of the invention.
Figure 4:
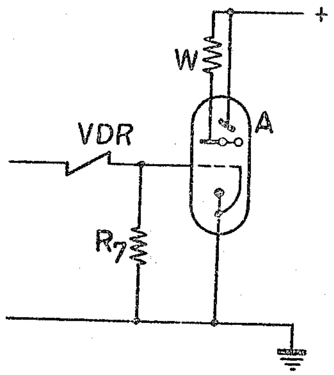
FIG. 4 illustrates a further modification of the arrangements shown in FIGS. 2 and 3.

In the embodiment shown in FIGURE 3, a voltage divider comprising resistors $R_4$ and $R_6$ of, for example, 820kΩ and 330kΩ, respectively, is connected parallel to the terminals $K_1$ and $K_2$. The grid of the indicator tube A is connected to the common point of said resistors through a series-resistor $R_5$ of, for example, 2.2MΩ. The series-combination of the resistors $R_4$ and $R_5$ is bridged by a capacitor C of, for example, 0.1 μf. A diode D is connected parellel to the resistor $R_5$ so that its cathode is connected to the grid of tube A.

When the capacitor C is discharged and the (negative) indication voltage increases, a charging current flows through resistor $R_6$ to the capacitor C whereby the diode D becomes conducting. When the indication voltage U again decreases, the diode D is no longer conducting and the discharge of capacitor C is determined substantially by the high-ohmic resistor $R_5$ (connected in series with the parallel circuit comprising the considerably smaller resistor $R_4$ connected in parallel with the series-combination of resistors $R_6$ and $R_1$. The charging time of capacitor C with the diode D conducting is thus considerably shorter than the discharging time-constant, and is preferably about 3% to 25%, more particularly about 15% to 25%, of the discharging time-constant. The charging time of the capacitor with the diode D conducting should be shorter than 100 milliseconds, preferably shorter than 20 milliseconds. In this case, it is ensured that, even with a comparatively rapid variation in tuning, the capacitor C is charged to the peak value when the nominal value is reached the first time. The peak value may correspond to the maximum value of the tuning indication voltage U since the anode of diode D is connected to ground potential through the comparatively small resistor $R_6$.

The sum of the second series-resistor $R_5$ and the parallel resistor $R_6$ must be equal to, or less than, the maximum resistance permissible at the input of the indicating device A. On the other hand, the sum of the first series-resistor $R_4$ and the parallel resistor $R_6$ must be equal to, or greater, preferably considerably greater, than the minimum permissible load resistance of the indication voltage source U and its internal resistance $R_i$. In this case, optimum indication conditions occur. It is thus usually not possible for the ratio between the charging time-constant and the discharging time-constant to be given an arbitrary value. However, the values in percent specified above can usually be attained and give rise in practice to a satisfactory operation.

The resistors $R_4$ and $R_6$ in FIGURE 3 bring about a voltage division of the input voltage applied via the terminals $K_1$ and $K_2$ to the indicating device A, for example, up to a value less than 50%. To avoid this voltage division for small signals and thereby obtain a clearer indication, a biased diode or a Zener diode Z, for example, of the type OAZ 200, may be connected in series with resistor $R_6$, as indicated in broken line in FIGURE 3. The diode Z will not conduct until the input voltage has exceeded an extreme value, for example, the Zener voltage of 1 to 5 volts.

By means of the arrangements described, a tuning indicator is achieved in which the peaks of the indication voltage produced by tuning are not flattened, for example, due to saturation or overcontrol phenomena. On the other hand, however, it may also be desirable to make these peaks even more pointed.

This may be achieved if, in another embodiment of the invention, a voltage divider comprising the series-combination of a voltage-dependent resistor V and an ohmic resistor $R_7$ is connected in front of the indicating device, more particularly, in front of the grid of tube A. As a result, voltages approaching the maximum value of the indication voltage are transmitted much better than low voltages. The resistor V may be a known VDR-resistor having an ohmic value which decreases considerably with increasing voltage, preferably independently of polarity. It may thus be achieved that for low voltages at the input of the voltage divider V, $R_7$ a large attenuation takes place from the input to the output, whereas higher voltages corresponding to the maximum value of the tuning peaks appear across resistor $R_7$ and hence at the grid of tube A substantially unattenuated. The peaks, which may have a sinusoidal shape, thus acquire steeper sides and a more distinct peak such as occurs, for example, when the third or fifth harmonic is superimposed on a sinusoidal fundamental wave. Consequently, the sides approach one another so that the nominal value can be recognised much more clearly and adjustment of the tuned position is considerably facilitated.

Especially in the device shown in FIGURE 3, an accelerated discharge of capacitor C due to the flow of grid current in the tube A occurs when the tuning control is turned too far past a transmitter into a region in which the indication voltage substantially no longer occurs. In this case, the electrode of capacitor C which is connected to the terminal $K_1$ is at approximately 0 volt and the grid of tube A becomes positive and discharges the capacitor C. When adjusting to a subsequent transmitter, the above-described process of charging up to the extreme value then present may begin again.

What is claimed is:

1. A tuning indicator circuit for a receiver comprising, a source of direct indication voltage which varies in amplitude with the tuning adjustment of said receiver and exhibits a resonant peak at the correct tuning position, tuning indicator means having an input terminal, a voltage divider comprising first and second resistance means serially connected across said voltage source, means connecting said input terminal to a junction point on said voltage divider such that said first resistance means is serially connected between the output of said voltage source and said input terminal, a capacitor connected in parallel with a portion of said first resistance means so as to have a charge path from said voltage source via a portion of said voltage divider, a diode, means connecting said diode between said input terminal and a point of fixed potential and in parallel with a portion of said voltage divider which makes up said charge path so that the peak value of the indication voltage at the input terminal of said tuning indicator means is shifted towards the value of the fixed potential, means providing a discharge path for said capacitor including a second portion of said voltage divider such that the discharge time constant for said capacitor is long relative to the tuning adjustment period during which said resonant peak in the indication voltage is passed, the time constant of said charge path being chosen so that the capacitor is approximately fully charged upon a single pass of said tuning adjustment through said resonant peak value of the indication voltage.

2. A circuit as described in claim 1 wherein said diode is poled to conduct a charging current for said capacitor and wherein said first and second resistance means of the voltage divider are proportioned so that the charging time constant of the capacitor with the diode conducting is 3 percent to 25 percent of the discharging time constant thereof.

3. A circuit as described in claim 2 wherein the charging time constant of the capacitor with the diode conducting is less than 100 milliseconds.

4. A tuning indicator circuit for a receiver comprising, a source of direct indication voltage which varies in amplitude with the tuning adjustment of said receiver and exhibits a resonant peak at the correct tuning position, a tuning indicator, a capacitor, a diode, a source of direct bias voltage, means serially connecting said capacitor, said diode, and said bias voltage source across the terminals of said indication voltage source so as to reverse bias the diode, first, second and third resistors, means connecting said first, second and third resistors in series across said terminals of the indication voltage source, means connecting the junction of said first and second resistors to the input of said tuning indicator, and means connecting the junction of said second and third resistors to the junction of said capacitor and diode so that said third resistor is connected in parallel with the series combination of said diode and said bias voltage source.

5. A circuit as described in claim 4 wherein the voltage of said bias voltage source is approximately equal to the optimum voltage which corresponds to a maximum indication of the tuning indicator.

6. A tuning indicator circuit for a receiver comprising, a source of direct indication voltage which varies in amplitude with the tuning adjustment of said receiver and exhibits a resonant peak at the correct tuning position, a tuning indicator, first and second resistors serially connected between one output terminal of said indication voltage source and the input of said tuning indicator, a capacitor connected in parallel with at least one of said resistors, a third resistor connected between the junction of said first and second resistors and the other terminal of said indication voltage source, a diode connected across said second resistor and poled so that the time constant of the capacitor charge path is appreciably smaller than the time constant of the capacitor discharge path.

7. A circuit as described in claim 6 wherein said capacitor is connected in parallel with the series combination of said first and second resistors, said capacitor being charged to a voltage level effective to hold said diode off until the voltage of said indication voltage source exceeds the voltage on said capacitor.

8. A circuit as described in claim 6 wherein the sum of the resistances of said second and third resistors is equal to, or is less than, the maximum value of resistance permitted at the input of the tuning indicator.

9. A circuit as described in claim 8 wherein the sum of the resistances of said first and third resistors is equal to, or is greater than, the minimum permissible value of load resistance of the indication voltage source.

10. A circuit as described in claim 6 further comprising a zener diode connected in series with said third resistor in the capacitor charge path.

11. In a receiver for signals of different frequencies which includes means for selectively tuning said receiver to said signals, a tuning indicator circuit comprising, means responsive to the tuning of said receiver for producing a direct control voltage which varies in amplitude therewith and exhibits a resonant peak at the selected signal frequency, a tuning indicator, a voltage divider comprising at least two serially connected resistors, means interconnecting said voltage divider with the output of said voltage producing means and the input of said tuning indicator so as to form a branch in series with said indicator input and a branch in parallel therewith, a capacitor connected in parallel with a portion of said series branch, a diode, means connecting said diode between said indicator input and a point of fixed potential and in parallel with a portion of said voltage divider which forms a charge path for the capacitor thereby to limit the voltage excursion at said indicator input approximately to the value of said fixed potential, a discharge path for said capacitor including a portion of said series branch, said diode being rendered conductive when said control voltage exceeds a given amplitude whereby the time constant of said capacitor charge path is reduced to a value substantially below the time constant of said discharge path.

12. A circuit as described in claim 11 further comprising a source of direct voltage connected so as to reverse bias said diode.

13. A circuit as described in claim 12 wherein the resistors of said voltage divider are chosen so that the charging time constant of the capacitor in the conductive state of the diode is approximately 3 percent to 25 percent of the discharging time constant thereof.

14. A circuit as described in claim 11 wherein said series branch comprises a first resistor and said parallel branch comprises second and third series connected resistors, and further comprising a source of direct reverse bias voltage, means connecting said capacitor, said diode and said bias voltage source in a first series circuit across said control voltage producing means so that said diode is caused to conduct at a given value of said control voltage, and means connecting a junction point on said first series circuit to the junction point on said parallel branch between said second and third resistors whereby said capacitor is connected across said first and second resistors and said diode and bias voltage source are connected across said third resistor.

15. In a receiver for signals of different frequencies which includes means for selectively tuning said receiver to said signals, a tuning indicator circuit comprising, means responsive to the tuning of said receiver for producing a direct control voltage which varies in amplitude therewith and exhibits a resonant peak at the selected signal frequency, a tuning indicator, a voltage divider comprising at least two serially connected resistors, means interconnecting said voltage divider with the output of said voltage producing means and the input of said tuning indicator so as to form a branch in series with said indicator input and a branch in parallel therewith, said series branch comprising first and second series connected resistors and said parallel branch comprising a third resistor connected to the junction point of said first and second resistors, a capacitor connected in parallel with a portion of said series branch, a diode, means connecting said diode to said indicator input and in parallel with said second resistor so as to shunt a portion of said voltage divider which forms a charge path for the capacitor thereby to limit the voltage excursion at said indicator input, a discharge path for said capacitor including a portion of said series branch, said diode being rendered conductive when the control voltage exceeds the voltage on the capacitor whereby the time constant of said capacitor charge path is reduced to a value substantially below the time constant of said discharge path.

16. A circuit as described in claim 15 wherein said capacitor is connected in parallel with the series combination of said first and second resistors.

References Cited by the Examiner

UNITED STATES PATENTS

| | | | |
|---|---|---|---|
| 2,773,119 | 12/1956 | Parker ---------- | 325—455 X |
| 3,056,927 | 10/1962 | Eisele et al. ------ | 325—455 X |
| 3,129,283 | 4/1964 | Tarantur ---------- | 325—455 |

KATHLEEN H. CLAFFY, *Primary Examiner.*

WILLIAM C. COOPER, *Examiner.*

R. LINN, *Assistant Examiner.*